US012603000B1

(12) United States Patent　　　　(10) Patent No.:　US 12,603,000 B1
　　　Ghafarianzadeh et al.　　　　　(45) Date of Patent:　　Apr. 14, 2026

(54) PREDICTION ERRORS REGION BASED AGGREGATION

(71) Applicant: Zoox, Inc., Foster City, CA (US)

(72) Inventors: Mahsa Ghafarianzadeh, San Francisco, CA (US); Ruitao Yi, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 120 days.

(21) Appl. No.: 18/591,984

(22) Filed: Feb. 29, 2024

(51) Int. Cl.
　　*G08G 1/0968*　　(2006.01)
　　*G01C 21/34*　　(2006.01)
　　*G08G 1/123*　　(2006.01)
　　*B60W 60/00*　　(2020.01)
(52) U.S. Cl.
　　CPC ....... *G08G 1/096827* (2013.01); *G01C 21/34* (2013.01); *G08G 1/123* (2013.01); *B60W 60/00253* (2020.02); *B60W 60/0027* (2020.02)
(58) Field of Classification Search
　　CPC .. G08G 1/096827; G08G 1/123; G01C 21/34; G05D 1/0027; G05D 1/0287; G05D 1/0291; G05D 1/606; G05D 1/622; G05D 1/2467; G05D 2101/10; G05D 2101/15; G05D 2101/20; B60W 60/00253; B60W 60/0027; B60W 30/095; B60W 30/0953; B60W 30/0956; B60W 2050/0043; B60W 2554/00; B60W 2554/40; B60W 2554/402; B60W 2554/4023; B60W 2554/4026; B60W 2554/4029; B60W 2554/404; B60W 2554/4041; B60W 2554/4042; B60W 2554/4043; B60W 2554/4044; B60W 2554/4045; B60W 2554/4046; B60W 2555/00; B60W 2555/20; B60W 2555/60; B60W 2556/00; B60W 2556/10; B60W 2556/20; B60W 2556/45; B60W 2556/50; B60W 2556/65
See application file for complete search history.

(56)　　　　　References Cited

U.S. PATENT DOCUMENTS

| | | | |
|---|---|---|---|
| 9,979,675 B2 * | 5/2018 | Patil | ...................... H04L 47/827 |
| 11,460,850 B1 | 10/2022 | Karasev et al. | |
| 11,488,422 B1 * | 11/2022 | Wu | ..................... G06F 16/9038 |
| 11,904,886 B1 | 2/2024 | Rowe | |

(Continued)

FOREIGN PATENT DOCUMENTS

| | | | | |
|---|---|---|---|---|
| CN | 111508272 A | | 8/2020 | |
| EP | 3972882 A1 | | 3/2022 | |
| KR | 20230032174 A | * | 3/2023 | ............. G05D 1/695 |

OTHER PUBLICATIONS

Office Action for U.S. Appl. No. 18/591,781, Dated Aug. 28, 2025, Ghafarianzadeh, "Prediction Errors Classification ," 16 pages.

*Primary Examiner* — Ramon A. Mercado
*Assistant Examiner* — Noah W Stiebritz
(74) *Attorney, Agent, or Firm* — Lee & Hayes, P.C.

(57)　　　　　ABSTRACT

Techniques for determining and aggregating prediction error are described herein. A prediction may be determined for an object within a region based on first sensor data. A prediction error may be determined based on a difference between the prediction and second sensor data. The prediction error may be associated with the region and aggregated by a same region. The aggregated prediction error may be used to determine an expansion of service into the region.

20 Claims, 6 Drawing Sheets

(56)          References Cited

U.S. PATENT DOCUMENTS

| | | | |
|---|---|---|---|
| 2019/0145765 A1 | 5/2019 | Luo et al. | |
| 2019/0308620 A1 | 10/2019 | Sapp et al. | |
| 2019/0337512 A1 | 11/2019 | Tahmasbi-Sarvestani et al. | |
| 2021/0064890 A1 | 3/2021 | Murveit et al. | |
| 2021/0139023 A1* | 5/2021 | Crego | G06V 20/584 |
| 2021/0192748 A1 | 6/2021 | Morales Morales et al. | |
| 2021/0223056 A1* | 7/2021 | Zhang | G06N 3/0475 |
| 2021/0237761 A1 | 8/2021 | Das et al. | |
| 2021/0319287 A1 | 10/2021 | Refaat et al. | |
| 2021/0362596 A1 | 11/2021 | Frossard et al. | |
| 2022/0400251 A1 | 12/2022 | Fisher | |
| 2023/0036371 A1 | 2/2023 | Caldwell et al. | |
| 2023/0138686 A1 | 5/2023 | Nadav et al. | |
| 2023/0195968 A1* | 6/2023 | Chu | G06T 19/00 |
| | | | 703/8 |
| 2024/0253667 A1 | 8/2024 | Grigore et al. | |
| 2024/0302184 A1* | 9/2024 | Tymofieiev | G01C 21/3889 |
| 2025/0123390 A1 | 4/2025 | Appaya Dhanabalan et al. | |

\* cited by examiner

300 ⟍

600

PREDICTION ERRORS REGION BASED AGGREGATION

BACKGROUND

Motion prediction of objects as an autonomous vehicle traverses an environment can be used assist an autonomous vehicle in understanding its surrounding environment. For example, prediction that a vehicle ahead will be performing a lane change into the lane of the autonomous vehicle assists the autonomous vehicle in adjusting its functions to take into account the potential lane change. Any error in these predictions may accordingly affect the operations of the autonomous vehicle and may be a result of features of a particular region, a particular object at the region, and/or an action performed by the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
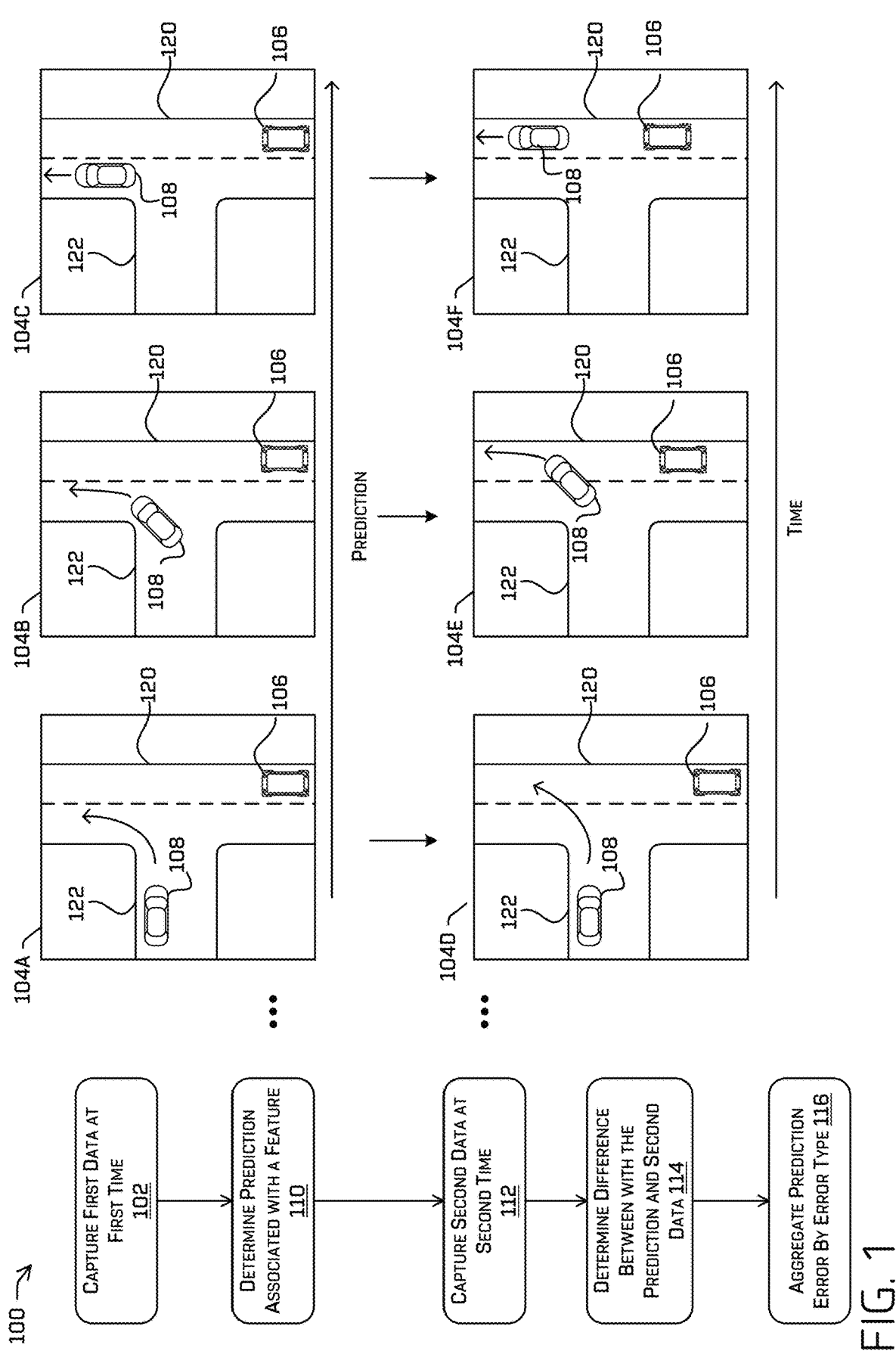
FIG. 1 illustrates a pictorial flow diagram of an example process for determining a prediction error.

Techniques for determining prediction error are discussed herein. In some examples, a vehicle traversing an environment can determine a prediction associated with an object in the environment using first sensor data received at a first time. In some examples, the vehicle can subsequently receive second sensor data associated with the object at a second time subsequent to the first time. In some examples, the prediction may be based on multiple features, such as current and/or historical movement and/or state data associated with the object for which the prediction is being generated and/or for other object(s) in the environment, and/or environmental feature(s). The vehicle can subsequently determine prediction error data by determining a difference between the prediction and the second sensor data. Additionally or alternatively, in some examples, the prediction, the first sensor data, and/or the second sensor data may be transmitted to a remote computing device to determine the prediction error data. In some examples, the prediction error may be classified and aggregated by error type, whereby a training dataset associated with a prediction model may be automatically adjusted based on determining which prediction error type requires additional training.

For example, the prediction error may be classified based on an object classification for which the prediction was determined (e.g., cyclist, vehicle, articulating vehicle, pedestrian, animal, or the like); a maneuver performed by the object; a state of the object before, during, and/or after the prediction; a region in which the prediction occurred; weather; a time of the day; a traffic pattern; an event within the region and/or the like. In some examples, the prediction error data may alternatively or additionally be aggregated based on a region; the region indicating a geographical area defined by road boundaries; a shape; one or more roadway(s); an area associated with an intersection, crosswalk, sidewalk, or the like; and/or the like. In such an example, the prediction error data generated while the autonomous vehicle was located within the region or generated for an object located within the region may be aggregated into an aggregated prediction error associated with the region. In some examples, this aggregated prediction error may be used to determine whether to expand service into the region or to pause or cease service in the region. For example, expanding service into the region may comprise transmitting an indication to one or more autonomous vehicles that the region is available for a particular mission type, such as passenger pickup/drop-off. In some examples, such a mission type may be disallowed/prevented for the region until such an indication is transmitted to an autonomous vehicle.

In some examples, the vehicle or the remote computing device can determine and classify an error type associated with a prediction error based at least in part on the first and/or second sensor data, the prediction data. Examples of the error type may include, but are not limited to, an object type of the object for which the prediction was determined, an object type and/or number of other objects present when the prediction was determined, an environmental feature, a maneuver, and/or the like. For example, the vehicle or the remote computing device can determine that there is a prediction error associated with the prediction of the second vehicle performing the lane change, and can classify the prediction error under a type of vehicle associated with the second vehicle (e.g., the second vehicle is a compact sized vehicle), the environmental feature associated with the prediction error (e.g., the second lane converting from a thru lane to a left turn lane), and/or the maneuver performed by the second vehicle (e.g., a lane change). In this example, this prediction error may be aggregated with other prediction error(s) of a same error classification as aggregated prediction error data, such that the aggregated prediction error data has a single data structure. For example, the aggregated prediction error data structure may comprise a database that includes categories for object type, environmental feature type, maneuver type, etc., along with the aggregated prediction errors for each classification. The aggregation may comprise determining an average, median, time-windowed average, and/or the like for a count of non-zero prediction errors and/or a magnitude of the prediction errors of a same type and/or region count. Additionally or alternatively, aggregating a prediction error for a particular classification may comprise aggregating prediction errors determined based at least in part on predictions determined by a same or different vehicles over time.

In some examples, the vehicle or the remote computing device can classify an error type in association with a region and/or an environmental feature, such as a map feature (e.g., whether the prediction error occurred at an intersection, a road condition associated with the prediction error, the existence and/or state of signage or traffic light near the road, and/or the like), a weather condition (e.g., was it raining, snowing, icy, and/or the like when the prediction error occurred), and/or the like. In some examples, alternatively, instead of a single data structure, each classification may be aggregated within its own data structure. For example, there may be an object type prediction error data structure (e.g., an object type database), an environmental feature prediction error data structure, a maneuver type prediction error data structure, and/or the like.

In some examples, the remote computing device can determine the aggregated prediction error data and/or determine a metric for each error type. For example, the metric may comprise a percentage of aggregated prediction error attributable to a particular error type versus prediction errors of all error types. Additionally or alternatively, the metric may comprise a score, such as a confidence score or normalized average magnitude of an aggregated error (e.g., normalized by number of occurrences). For example, the remote computing device can compare prediction errors by error types within the aggregate prediction error data and determine, based on the comparison, that prediction errors associated with lane changes make up the highest percentage of prediction errors or that prediction errors associated with animals have a greatest average or median magnitude in comparison to the average or median error of other error types. In some examples, the remote computing device can rank the prediction errors based on the metric. The remote computing device can adjust a training of a prediction model associated with the vehicle based on the metric or the ranking of the metric. In such an example, the remote computing device may adjust the training by automatically adjusting a training dataset to include more scenario data associated with the error type based on the metric (e.g., with the highest prediction error, a greatest score, a greatest percentage). For example, if the average prediction error for lane changes conducted at a particular intersection is highest among prediction errors determined for different error types, the number of scenarios that include log data collected from that intersection and that indicate that an object lane changed may be increased. In some examples, the training dataset may be automatically adjusted to include scenarios that include up to the top 10 highest prediction error type and may increase the number of scenarios commensurate to the ranking (e.g., a smaller increase as the ranking decreases). Additionally or alternatively, the training dataset may be altered to reduce scenarios associated with error types at the bottom of the ranking or with prediction errors that are below a lower bound prediction error.

In some examples, the prediction or planner model may use a diffusion-based or similar model which may use an encoder. In some examples, the prediction errors may be applied during inference of a machine-learned model to guide predictions made by the vehicle and/or the fleet and/or generated trajectories of the same. In some examples, the inference may be conditioned based on the metric or the ranking of the metric to reduce (e.g., minimize) prediction errors of error types that appear most frequently. For example, the ranking of the metric may rank unprotected left turns among the top three highest prediction error types, and therefore, during inference, the prediction model may be steered to focus on making more accurate predictions of unprotected left turns. The steering may be based on a token that may be encoded and modify outputs of the machine-learned model wherein the modification of the token may be used to condition output of the corresponding model to account for prediction error(s) as disclosed herein. Additional examples of steering a diffusion model during inference can be found, for example in U.S. application Ser. No. 18/217,377 titled "Generating Synthetic Driving Trajectories Using Diffusion Guidance" filed Jun. 30, 2023, the entirety of which is herein incorporated by reference in its entirety of all purposes and in U.S. application Ser. No. 18/394,304 titled "Simulated Trajectory Generation Using Generative Machine-Learned Models" filed Dec. 22, 2023, the entirety of which is herein incorporated by reference in its entirety for all purposes.

In some examples, the remote computing device can determine, based on the aggregated prediction error data associated with a region, whether to expand service into the region or to suspend service from the region. When the fleet does not currently service the region (e.g., ferry passengers, conduct deliveries), vehicles of the fleet may traverse through the region on a trial basis to test whether to expand service into the region. In some examples, as the vehicles traverse through the region, prediction errors associated with the region may be aggregated as described herein. In some examples, the remote computing device can determine, based on the aggregated prediction error data associated with the region being below an error threshold, to expand service into the region. Expanding the service into the region can include, but is not limited to, vehicles within the fleet picking up and dropping off passengers within the region, vehicles within the fleet determining trajectories that traverse through the region, and/or the like. In some examples, when the fleet is currently servicing the region, the remote computing device can determine, based on the aggregated prediction error data associated with the region exceeding the error threshold, to suspend service within the region. Suspending service can include, but is not limited to, suspending picking up and dropping off of passengers within the region, rerouting trajectories of vehicles to avoid the region, and/or the like.

In some examples, the remote computing device can further determine an accumulated distance driven by vehicle(s) within the region. In some examples, before determining to expand service into the region, the remote computing device can determine based on whether the accumulated distance meets or exceeds a threshold distance. In some examples, determining whether the accumulated distance meets or exceeds the threshold distance may be a primary or overriding factor in determining whether to expand service into the region. For example, even when the aggregate prediction error data associated with the region is below the error threshold, if the remote computing device determines that the accumulated distance is below the distance threshold, the remote computing device will determine that the fleet will not extend service into the region. In some examples, the distance threshold may be determined based at least in part on a total aggregated prediction error and/or aggregated prediction error(s) associated with different error type(s).

The techniques for determining the prediction error can improve the fleet management functions providing a robust method of testing and/or determining the accuracy of the predictions made by autonomous vehicles within the fleet at a particular location or geographic region. Determining the accuracy of the predictions can improve vehicle or fleet operation and safety of vehicle and/or the fleet by helping to improve training of the prediction model associated with the vehicles in the fleet. In addition, these techniques can further improve vehicle safety by ensuring that the fleet operates in locations or geographic regions in which the vehicle can make accurate.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in semi-autonomous or non-autonomous vehicles, and/or in an aviation or nautical context.

FIG. 1 illustrates an example process 100 for determining a prediction error. In some examples, the process 100 may be performed by vehicle control system 402 of FIG. 4, the vehicle control system 402 being a vehicle controller of a vehicle. In some examples, the vehicle may be an autonomous vehicle, a semi-autonomous vehicle, an aerial vehicle, and/or the like. In some examples, the vehicle may be a part of a fleet of vehicles.

At operation 102, the example process may comprise capturing, within a region and at first time, first data. In some examples, the data can include features such as one or more objects and/or environmental features. In some examples, the first data may be captured by one or more stationary objects or sensor configuration external to the vehicle, such as a traffic camera, a dash camera, and the like or by one or more sensors associated with the vehicle such as the sensor system(s) 406 of FIG. 4. In some examples, the first data may include raw sensor data. Additionally, a perception system associated with the vehicle may process the raw sensor data subsequent to capture and use the processed sensor data for operation 110.

At operation 110, the vehicle may determine a prediction associated with an object in the first data. In some examples, the prediction may be determined by a prediction component associated with the vehicle such as the prediction component 426 of FIG. 4. In some examples, the prediction may include a predicted state (e.g., a pose (i.e., position and orientation) of the object, a door/aperture state, velocity, acceleration, other state moving/waiting/turning) at a second time and/or an action performed by the object (e.g., a motion, a maneuver, or the like) at the second time or from a current time to the second time. In some examples, the prediction component 426 may determine the prediction using a trained machine-learned prediction model based on prior log data received from the vehicle and/or other vehicles. In some examples, multiple objects may exist at a location within the region and may be indicated by the first data. In some examples, a prediction may be determined for each object. For example, the first data may include multiple vehicles, multiple pedestrians, multiple cyclists, and/or the like and a prediction may be made for each of the vehicles, pedestrians, and cyclists.

An example of the vehicle determining a prediction is illustrated in examples 104A-C. Example 104A illustrates a top-down view of a scene at an intersection at a first time. In example 104A, the first vehicle 106 may be the vehicle determining the prediction and the second vehicle 108 may be a subject of the prediction. The first data captured by the first vehicle 106 may be used by a perception component of the first vehicle 106 to determine a pose of the second vehicle 108 at second road 122, as illustrated in example 104A.

Examples 104 B and C illustrate a prediction determined by the second vehicle 108, including the second vehicle 108 making a left turn from the second road 122 into the left lane of first road 120 at or by the second time. Example 104A illustrates when second vehicle 108 is predicted to start the turn, which may be a current time. Example 104B illustrates when second vehicle 108 is predicted to be in the middle of the turn. Example 104C illustrates when second vehicle 108 is predicted to complete the turn. In some examples, the prediction may comprise only a final state, such as depicted in example 104C or may predict a sequence of states, which may include an intermediate predicted state, such as is depicted at example 104B.

At operation 112, the example process may comprise capturing, at a second time, second data. In some examples, the second data may be captured by the sensor(s) described above in association with the operation 102. In some examples, the operation 112 may further comprise the vehicle receiving sensor data from the first time until the second time (e.g., in an example where the prediction includes a set of predicted states for the object) or, in an additional or alternate example, operation 112 may comprise the vehicle receiving sensor data at the second time. Examples 104D-F illustrate a top-down view of example second data. In examples 104D-F, the second vehicle 108 makes a left turn from the second road 122 into a right lane of the first road 120.

At operation 114, the prediction component 426 can determine a difference between the prediction and the second data. Alternatively, the prediction and the second data may be transmitted to a remote computing device, such as computing device 432 of FIG. 4, and the difference may be determined by the remote computing device. Determining the difference may include, but not limited to, determining an Euclidean difference between points along a path taken by the object in the prediction and a path taken by the object as recorded in the second data, determining a distance between a final state of the object in the prediction and a final state of the object as recorded in the second data, determining an angular difference in a heading of the object, determining a difference between a position and/or orientation of the object in the prediction in its final state and a position and/or orientation of the object as recorded in the second data in its final state, and/or the like. In the examples 104A-F, a prediction error may be determined and logged due to one or more of an Euclidean difference between points along the path taken by the second vehicle 108 in examples 104A-C and the path taken by the second vehicle 108 in examples 104D-F, a difference between a distance between example 104C and example 104F, or a difference between the position in example 104C and example 104F.

In some examples, if a difference is determined between the prediction and the second data, a prediction error may be determined and logged. In the examples 104A-F, a prediction error may be determined and logged because there is a difference between the prediction of examples 104A-C and the second data captured in examples 104D-F.

At operation 116, the prediction error may be aggregated by error type as aggregated prediction error data and/or as a metric for each error type. For example, the metric may comprise a percentage of aggregated prediction error attributable to a particular error type versus prediction errors of all error types. Additionally or alternatively, the metric may comprise a score, such as a confidence score or normalized average magnitude of an aggregated error (e.g., normalized by number of occurrences). Examples of the error type may be, but are not limited to, object type, environmental feature type, maneuver type, by regions, or the like. In some examples, the aggregated prediction error data and/or the metric may be stored within a data structure such as a database. Additionally, the error type may include prediction errors made by the vehicle and/or prediction errors made by other vehicles in the fleet and/or other vehicles that traverses the region. The errors may be correlated to a version of a vehicle or vehicle system (e.g., hardware and/or software). For example, some errors may be tied to a version of sensor used on a vehicle and the error data may be used to account for errors associated with that version of sensor, as further disclosed herein.

The aggregation may comprise determining a total, an average, median, average over a time/incident number range, and/or the like for a same classification of prediction error. Additionally or alternatively, aggregating a prediction error for a particular classification may comprise aggregating prediction errors determined based at least in part on predictions determined by a same or different vehicles over time. In some examples, the aggregation may be performed by the remote computing device.

In the example that prediction errors are aggregated by regions, such aggregation may include comprise determining a total, an average, a median, an average over the time/incident number range, and/or the like for prediction errors within a same region. The aggregation may also include updating the aggregate prediction error data with prediction error(s) from the vehicle as well as in association with other vehicles as the vehicles traverse through the region. As each vehicle traverses through the region and determine additional prediction error(s), each additional prediction error may be aggregated into the aggregated prediction error data such that the total, the average, the median, the average over the time/incident number range, and/or like for prediction errors within the region are updated to take into account each additional prediction error within the region. Additionally or alternatively, the metric may also be similarly updated to take into account each additional prediction error within the region.

Further, in some examples, the aggregation may include multiple region within a larger geographic area such as multiple neighborhoods within a city or multiple intersections and roads within a neighborhood. In some examples, the aggregated prediction error data may further include an amount of features (e.g., objects or agents) associated with each location. In such an example, each region may be separate entries or partitions within the aggregated prediction error data structure. For example, a prediction error determined at the first region would be aggregated at the first partition, and a second prediction error determined at the second region would be aggregated at the second partition.

The aggregation described above may similarly be implemented for other error types (e.g., object types, environmental feature types, maneuver types, and/or the like). For example, the prediction error associated with examples 104A-F may be classified under sedan, unprotected left turn, and at a three-way intersection, and the portions of the aggregated prediction error data that are associated with sedan, unprotect left turn, and three-way intersection may be updated to take into account the prediction arrow of examples 104A-F.

Figure 2:
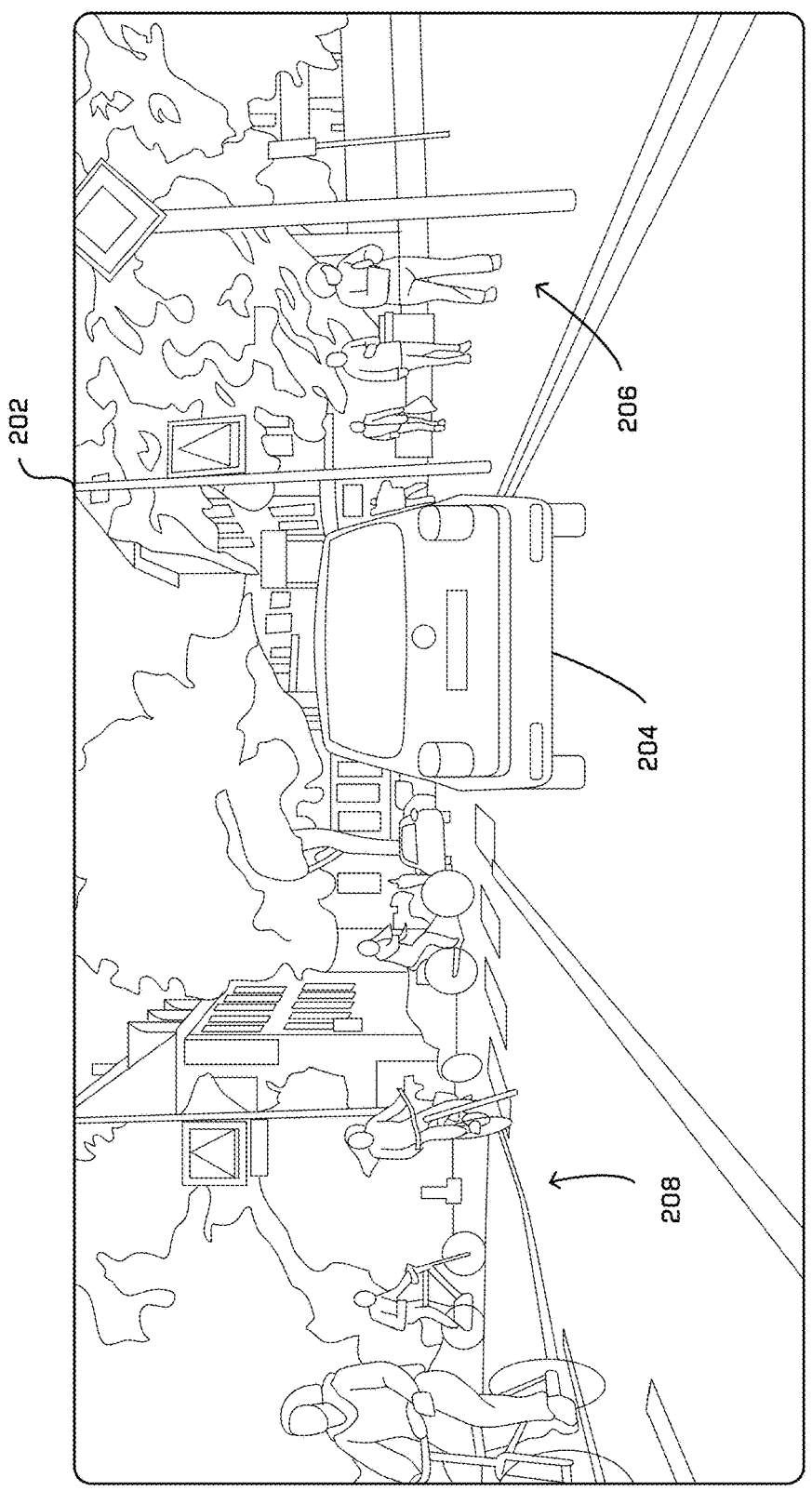
FIG. 2 illustrates example sensor data depicting a scene that may be used as part of the techniques discussed herein.

FIG. 2 depicts an example scenario 200 of a scene 202 associated with captured sensor data.

The scene 202 depicts a view of a location within a region that a sensor of a vehicle such as the first vehicle 106 of FIG. 1 may capture. The scene 202 includes multiple objects such as a second vehicle 204, pedestrians 206 and cyclists 208. The vehicle can determine a prediction and prediction error for the second vehicle 204, each pedestrian 206, and each cyclist 208 based on the process described in association with FIG. 1, as well as throughout this disclosure. In some examples, any prediction error(s) determined by the vehicle may be aggregated by location and/or classified and aggregated by type as described in association with FIG. 1, as well as throughout this disclosure.

Figure 3:
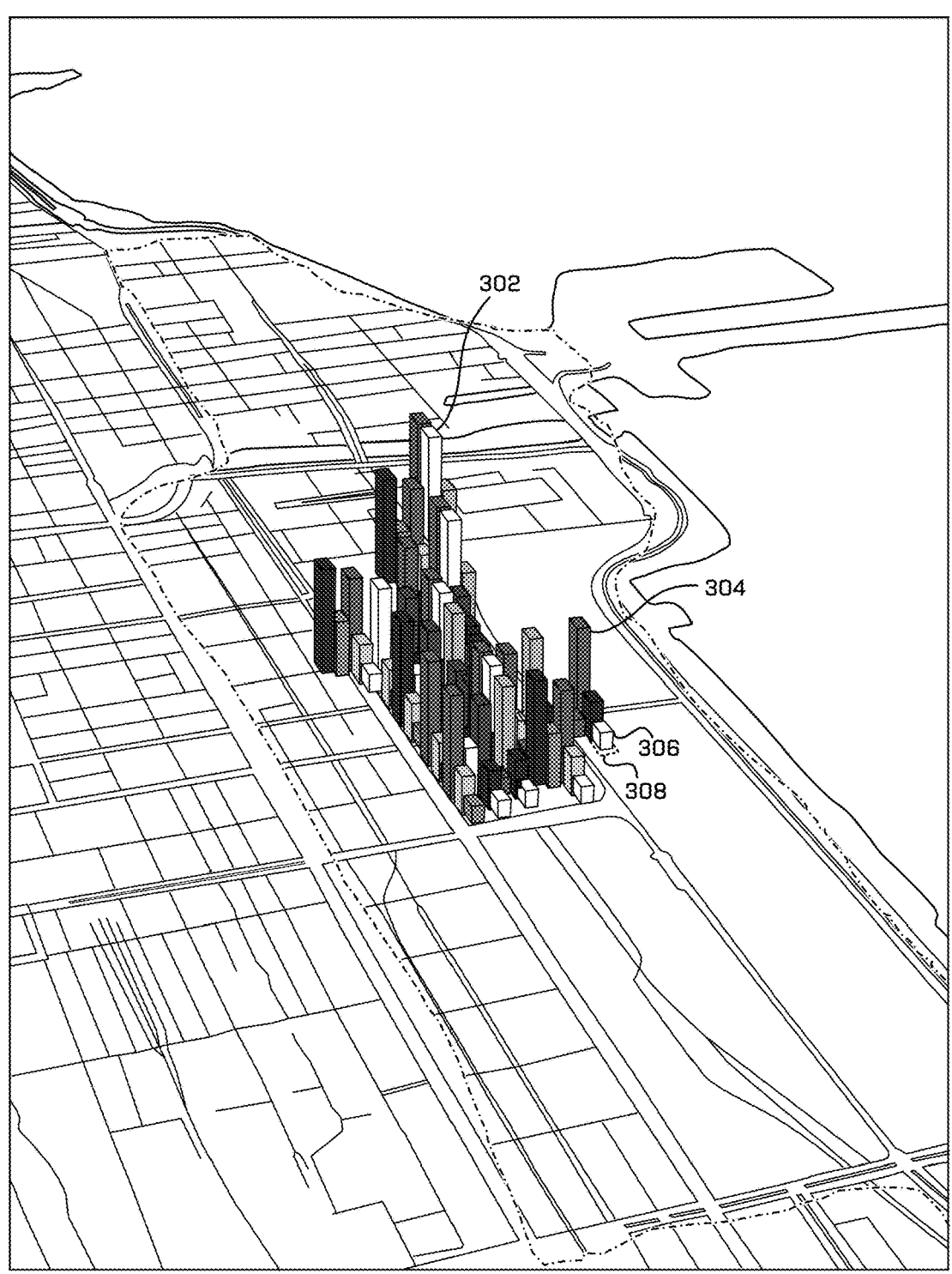
FIG. 3 illustrates an example visualization of region aggregated prediction error data.

FIG. 3 illustrates an example visualization 300 of the aggregated prediction error data for different regions in the environment. Note that although the bars are associated with rectangles, the regions may have any other shape or size (e.g., hexagonal, street and/or intersection-defined borders and/or vertices). The visualization 300 includes a map of a geographic region and various bars that rises from the map. Each bar may be associated with a different region within a geographic area and represents an aggregated prediction error data at that region for an error type or a total aggregated prediction error for the region. In some examples, bar height may indicate, but is not limited to, an amount of objects detected, an accumulated distance traveled by a vehicle or a fleet of vehicles within the region (e.g., total miles driven), an amount of predictions made for objects within the region, with the bar height increasing as more objects are detected, more predictions are made, and more distances are accumulated, and bar shade may indicate total count of a magnitude or an average or median magnitude of prediction errors for the region, prediction error count or magnitudes by error type, or magnitude per miles driven, prediction errors count or magnitude per detected object, and/or the like, with the shade increasing in darkness as the magnitude or count of the prediction errors increase.

As examples, FIG. 3 includes a first bar 302, a second bar 304, and a third bar 306. FIG. 3 also illustrates an example region 308 (also referred to as a third region 308) encompassing the third bar 306, illustrating, as an example, that the third bar 306 is associated with a region within the greater geographic area of FIG. 3. Each bar within the FIG. 3, such as the first bar 302 and the second bar 304, may also be associated with a different region within the greater geographic area of FIG. 3. For instance, the first bar 302 may be associated with a first region and the second bar 304 may be associated with a second region. The first bar 302 for the first region illustrates a light bar shade and the tallest bar height amongst the bars 302, 304, and 306. The second bar 304 for the second region illustrates a darker shade than the first bar 302 and has a lower bar height than the first bar 302. The third bar 306 for the third region 308 illustrates a similar shade as the first bar 302 and has the lowest bar height amongst the three bars. This may indicate that the first bar 302 and the third bar 306 comprises similar prediction error per detected object within their respective regions while the second bar 304 comprise higher prediction error per detect object (e.g., the prediction error count and/or magnitude relative to amount of objects for the first region and the third region 308 are lower than the prediction error relative to the amount of objects for the second region). In addition, because the first bar 302 and the second bar 304 has higher bar height than the third bar 306, this may indicate there are more objects detected within the first region and the second region than within the third region 308 and/or more predictions made for objects within the first region and the second region than within the third region 308. Further, the magnitude of the bar height for the third bar 306 may indicate a lower accumulated distance for the third region 308 than the first region and the second region. Because the bar height associated with the third region 308 is amongst the lowest within the visualization 300, this may indicate that the prediction error data for the third region 308 may not be representative of what the prediction error should be. In other words, not enough prediction and prediction error data may have been gathered at the third region 308. In such an example, additional vehicles may be sent to traverse the third region 308 to aggregate additional data.

Figure 4:
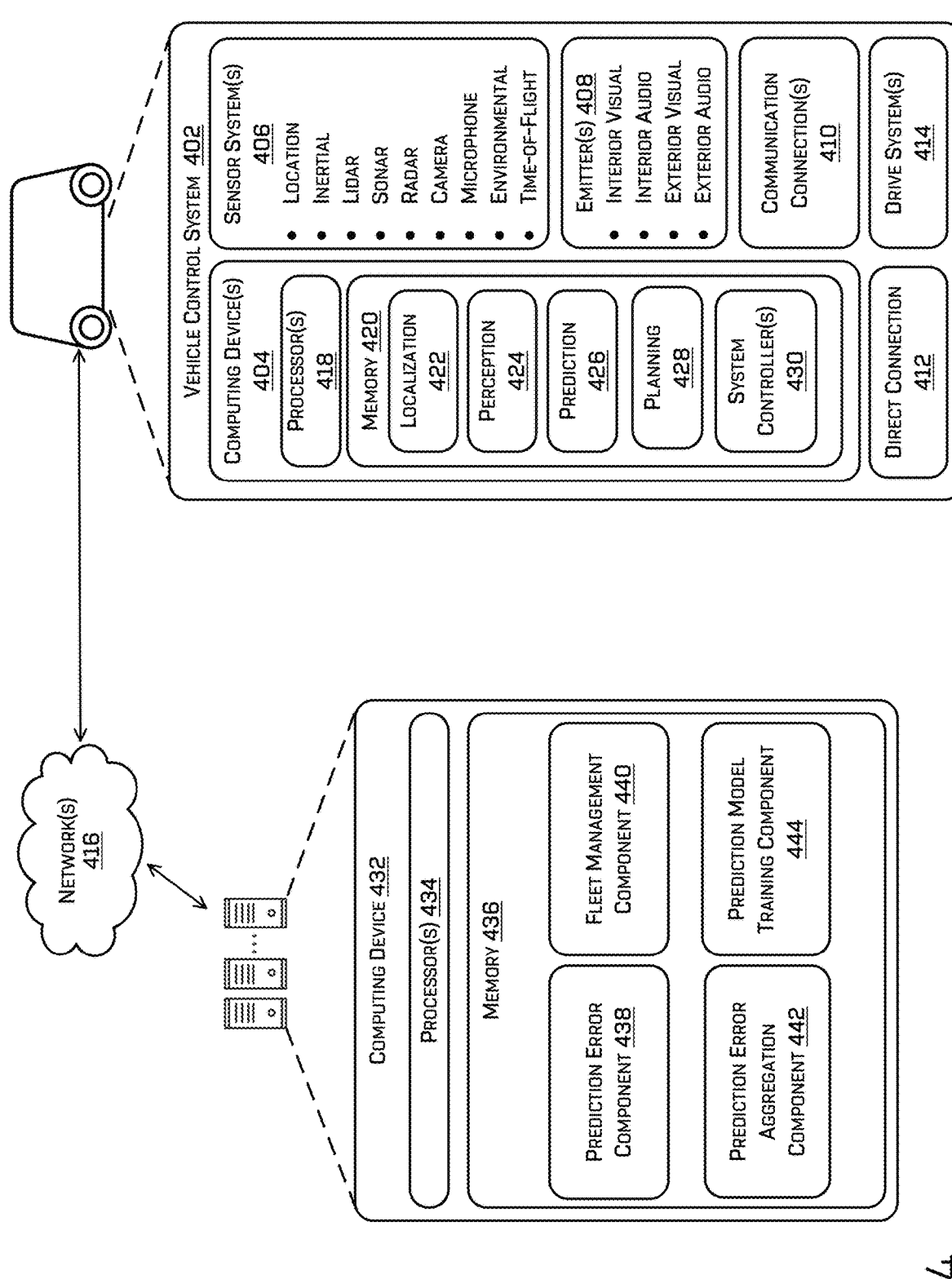
FIG. 4 illustrates a block diagram of an example system for implementing the techniques described herein.

FIG. 4 illustrates an example computing environment 400 that may be used to determine and aggregate prediction errors according to the techniques described herein. The computing environment 400 may include a computing device 432 and a vehicle control system 402. In this example, the computing device 432 is a remote computing device that communicates with the vehicle control system 402 via network(s) 416. In some examples, the computing device 432 may determine and aggregate prediction errors as described in association with FIG. 1, as well as throughout this disclosure. The components of computing device 432 may be implemented within a single computing system, as in this example, or may be implemented in separate computer systems.

The vehicle control system 402 may include various software-based and/or hardware-based components of an autonomous vehicle, and may be used to control autonomous vehicles traversing through physical environments and/or simulated vehicles operating within virtual and/or log-based driving simulations. The vehicle control system 402 may be similar or identical to the vehicle control system of first vehicle 106 as well as any simulated autonomous vehicles in simulation.

In this example, the vehicle control system 402 and the computing device 432 and are illustrated as discrete computing systems communicating over one or more networks 416, although in other implementations the functionality of each of the systems 402, 432, may be carried out in the same computing environment. By way of non-limiting example, software executing the functionality of the vehicle control system 402 may be uploaded or otherwise incorporated into the computing device 432 and/or software executing the computing device 432 may be uploaded to or otherwise made incorporated into the vehicle control system 402.

The vehicle control system 402 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 402 may operate within a real associated vehicle, such as a fully or partially autonomous vehicle having any other level or classification. In some instances, the techniques described herein may be usable by non-autonomous vehicles as well. Additionally and/or alternatively, the vehicle control system 402 may operate independently from any vehicle, for example, as a hardware and software-based controller for a simulated vehicle executing in a computing environment during the development, testing, and validation processes for the vehicle control system 402. In addition, while implementations of the vehicle control system 402 described herein may include simulating a control system of an autonomous vehicle, semi-autonomous vehicle, or a non-autonomous vehicle, some of the techniques may be in a simulated environment, using a simulated vehicle.

The vehicle control system 402 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 402 can be powered by one or more internal combustion engines, one or more electric motors, hydrogen power, any combination thereof, and/or any other suitable power sources. Although the associated vehicle may have four wheels, the vehicle control system 402 and associated techniques described herein can be incorporated into vehicles having fewer or a greater number of wheels, and/or tires. The vehicle control system 402 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 402 can include a computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle to exchange data and/or to provide power), and one or more drive system(s) 414. The one or more sensor system(s) 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the real or simulated vehicle associated with the vehicle control system 402. As another example, the camera sensors can include multiple cameras disposed at various locations about the exterior and/or interior of the associated real or simulated vehicle. The sensor system(s) 406 can provide input to the computing device(s) 404.

The vehicle control system 402 can also include one or more emitter(s) 408 for controller the emitting of light and/or sound via the real or simulated vehicle associated with the vehicle control system 402. The one or more emitter(s) 408 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 402 can also include one or more communication connection(s) 410 that enable communication between the vehicle control system 402 and one or more other local or remote computing device(s) (e.g., a remote teleoperations computing device) or remote services. For instance, the communication connection(s) 410 can facilitate communication with other local computing device(s) on the associated real or simulated vehicle, and/or the drive system(s) 414. Also, the communication connection(s) 410 can allow the vehicle to communicate with other nearby computing device(s) (e.g., other nearby vehicles, traffic signals, etc.).

The communications connection(s) 410 can include physical and/or logical interfaces for connecting the computing device(s) 404 to another computing device or one or more external networks 416 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 410 may comprise the one or more modems as described in detail above.

In at least one example, the vehicle control system 402 can include one or more drive system(s) 414. In some examples, the real or simulated vehicle associated with the vehicle control system 402 can have a single drive system 414. In at least one example, if the vehicle has multiple drive systems 414, individual drive systems 414 can be positioned on opposite ends of the associated vehicle (e.g., the front and the rear, etc.). In at least one example, the drive system(s) 414 can include one or more sensor system(s) 406 to detect conditions of the drive system(s) 414 and/or the surroundings of the vehicle. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle control system 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more modules to perform various functionalities of the drive system(s) 414. Furthermore, the drive system(s) 414 also include one or more communication connection(s) that enable communication by the respective drive system with one or more other local or remote computing device(s).

The computing device(s) 404 within the vehicle control system 402 can include one or more processor(s) 418 and memory 420 communicatively coupled with the one or more processor(s) 418. In the illustrated example, the memory 420 of the computing device(s) 404 stores a localization component 422, a perception component 424, a prediction component 426, a planning component 428, and one or more system controller(s) 430. Though depicted as residing in the memory 420 for illustrative purposes, it is contemplated that the localization component 422, the perception component 424, the prediction component 426, the planning component 428, and the one or more system controller(s) 430 can additionally, or alternatively, be accessible to the computing device(s) 404 (e.g., stored in a different component of vehicle control system 402 and/or stored remotely and accessible to the vehicle control system 402.

In memory 420 of the computing device(s) 404, the localization component 422 can include functionality to receive data from the sensor system(s) 406 to determine a position of the real or simulated vehicle associated with the vehicle control system 402. For example, the localization component 422 can include and/or request/receive a three-dimensional map of the real or simulated environment and can continuously determine a location of the autonomous vehicle within the map. In some instances, the localization component 422 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 422 can provide data to various components of the vehicle control system 402 to determine an initial position of an autonomous vehicle for generating a trajectory, as discussed herein.

The perception component 424 can include functionality to perform object detection, segmentation, and/or classification. In some examples, the perception component 424 can provide processed sensor data that indicates a presence of an entity that is proximate to the real or simulated vehicle associated with the vehicle control system 402 and/or a classification of the entity as an entity type (e.g., car, pedestrian, cyclist, building, tree, road surface, curb, sidewalk, unknown, etc.). In additional and/or alternative examples, the perception component 424 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 424 can include functionality to store perception data generated by the perception component 424. In some instances, the perception component 424 can determine a track corresponding to an object that has been classified as an object type. For purposes of illustration only, the perception component 424, using sensor system(s) 406 can capture one or more images of a real or simulated environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 426 can generate one or more probability maps representing prediction probabilities of possible locations of one or more objects in a real or simulated environment. For example, the prediction component 426 can generate one or more probability maps for vehicles, pedestrians, animals, and the like within a threshold distance from the vehicle 402. In some instances, the prediction component 426 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment. In some examples, the prediction component 426 can determine prediction errors and aggregate prediction errors by location and/or type as described in association with FIG. 1, as well as throughout this disclosure. In some examples, the prediction component 426 can receive an updated prediction model trained by the prediction model training component based on the prediction errors.

The planning component 428 can determine a path for the vehicle control system 402 to direct the real or simulated vehicle through an environment. For example, the planning component 428 can determine various routes and paths and various levels of detail. In some instances, the planning component 428 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 428 can generate an instruction for guiding the autonomous vehicle along at least a portion of the route from the first location to the second location. In at least one example, the planning component 428 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 428 can alternatively, or additionally, use data from the perception component 424 to determine a path for the real or simulated vehicle associated with the vehicle control system 402 to follow to traverse through an environment. For example, the planning component 428 can receive data from the perception component 424 regarding objects associated with an environment. Using this data, the planning component 428 can determine a route to travel from a first location (e.g., a current location) to a second location (e.g., a target location) to avoid objects in an environment. In at least some examples, such a planning component 428 may determine there is no such collision free path and, in turn, provide a path which brings the vehicle to a safe stop avoiding all collisions and/or otherwise mitigating damage.

As discussed above, the computing device 432 may determine and aggregate prediction errors. The computing device 432 may be the remote computing device described throughout this disclosure. Computing device 432 may include one or more processors 434 and memory 436 communicatively coupled with the one or more processors 434. In the illustrated example, the memory 436 of the computing device 432 stores a prediction error component 438, a fleet management component 440, a prediction error aggregation component 442, and a prediction model training component 444. Though depicted in FIG. 4 as residing in the memory 436 for illustrative purposes, it is contemplated that some or all of the systems and components 438-444 may additionally, and/or alternatively, be stored remotely at another computing device and accessible to the computing device 432 through networks 416 or within the vehicle control system 402.

The prediction error component 438 may determine the aggregate prediction error as described in association with FIG. 1, as well as through this disclosure. The fleet management component 440 can determine based on the prediction errors associated with a region, whether the expand fleet service into the region or suspend fleet service within the region. Additional details with respect to expanding and suspending fleet service is described in association with FIG. 6, as well as throughout this disclosure. The prediction error aggregation component 442 can aggregate error by error type as described in association with FIGS. 1, 5, and 6, as well as throughout this disclosure. The prediction model training component can adjust training dataset(s) to prioritize scenarios with types based on a ranking of the error types. Additional details with respect to the functions of the prediction model training component may be described in association with FIG. 5, as well as throughout this disclosure.

The processor(s) 418 of the computing device(s) 404 and the processor(s) 434 of the computing device 432 can be any suitable processor capable of executing instructions to process data and perform operations as described herein. By way of example and not limitation, the processor(s) 418 and 434 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420 of the computing device(s) 404, and memory 436 of the computing device 432 are examples of non-transitory computer-readable media. The memory 420 and 436 can store an operating system and one or more software applications, instructions, programs, and/or data to implement the methods described herein and the functions attributed to the various systems. In various implementations, the memory 420 and 436 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 420 and memory 436 can be implemented as a neural network.

Figure 5:
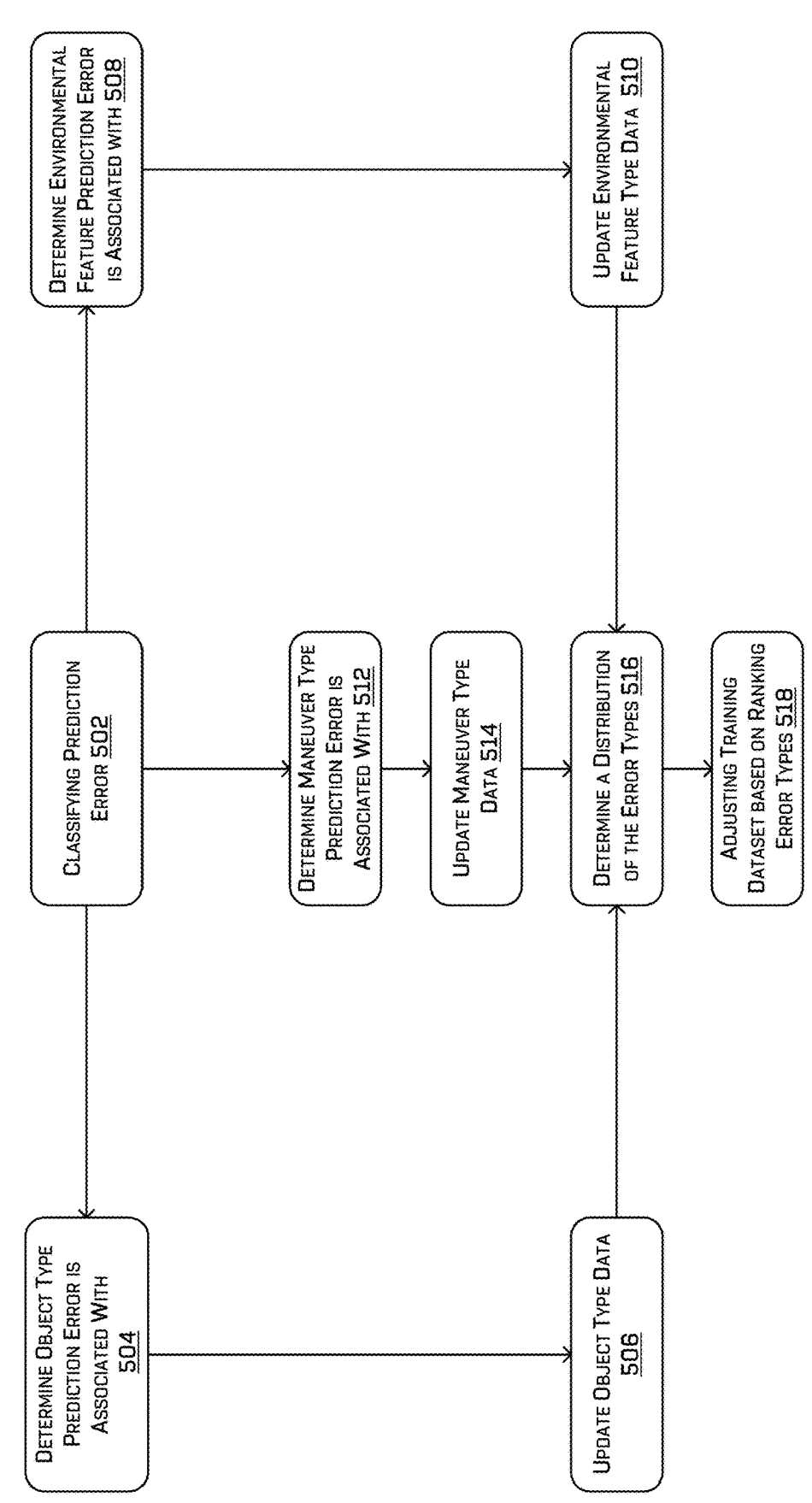
FIG. 5 illustrates a flow diagram of an example process of aggregating prediction error at a region to determine expansion of service.

FIG. 5 illustrates a flow diagram of an example process 500 associated with classifying and aggregating prediction error by types. In some examples, some or all of process 500 can be performed by one or more components described in association with FIGS. 1-4, as described herein. Additionally, some portions of process 500 can be omitted, replaced, and/or reordered.

At operation 502, the process can include determining a prediction error, as described herein, and classifying the prediction error into one or more classifications. Examples of the one or more classifications may include, but are not limited to, an object classification, an environmental feature classification, a maneuver classification (also referred to as an action classification), and/or the like. In some examples, a perception component of a vehicle such as the perception component 424 of FIG. 4 may determine the one or more classification. In some examples, the perception component 424 may determine the one or more classification using one or more machine learned models. In some examples, the operation 502 may correspond to the operation 118 of FIG. 1.

At operation 504, the process can include determining the object classification associated with the prediction error. In some examples, the object classification may include, but are not limited to, object type, object position relative to the vehicle, object speed relative to the vehicle, and/or the like. In some examples, the object type may be classified at a high level such as the prediction error is associated with a vehicle, a pedestrian, a cyclist, and/or the like. In some examples, the object type may be more specific such as being classified based on the type and/or size of the vehicle. For example, the prediction error may be classified in association with a midsize sedan. In some examples, the type of vehicle and the size of the vehicle may be separately classified and used in cross correlation. In some examples, the object may also be classified based on whether the object is a stationary object or dynamic object.

To determine the object classification, in some examples, the perception component 424 can receive sensor data associated with the environment captured by a vehicle or an external sensor (e.g., the first data and/or the second data as described in association with FIG. 1) and determine, by using techniques such as segmentation on the sensor data, various objects captured in the sensor data. The sensor data may be continuously captured over time or captured in discrete time intervals. The perception component 424 can further use a machine learned model to determine and classify an object type associated with each object in the sensor data. The machine learned model may be trained using log data from the vehicle described in association with FIG. 1 or other vehicles to classify multiple objects in the sensor data (e.g., trained to classify objects as a vehicle, a pedestrian, a cyclist, an animal, and/or the like). The perception component 424 can also determine and classify the relative position of the object to the vehicle based on a position of the object within the sensor data, and the relative object speed based on a change in the position of the object within the captured sensor data over time.

At operation 506, the process can include aggregating and updating the classification prediction error data with prediction error and the object type associated with the prediction error. The remote computing device may receive, from vehicle control system 402, a prediction error (or an indication of a prediction error) and an object classification associated with the prediction error. The remote computing device may subsequently increase a total associated with the object classification within the aggregated classification for each prediction error associated with the object classification. For example, for each prediction error associated with a pedestrian, the remote computing device may increase an amount of a total pedestrian prediction error by one. Additional details with respect to operation 506 may be described in association with FIG. 1, as well as throughout this disclosure.

At operation 508, the process can include determining and classifying an environmental feature that the prediction error is associated with. Examples of the environmental features may include, but not limited to, road surface, road condition, weather, time of day, presence of traffic light or traffic sign, a geometric feature of the region and/or location (e.g., the shape of an intersection may be irregular or different from the usual cross shaped or T-shaped intersection or the intersection is more complex than the usual three-way or four-way junction such as a five-way or six-way junction), and/or the like. In some examples, multiple environmental features may be associated with the prediction error. In some examples, each relevant environmental feature may be cross correlated with one or more other relevant environmental features, one or more relevant object types and/or a relevant maneuver type.

To determine the environmental feature, the perception component 424 can determine and classify, for example using, on the sensor data, the machine learned model or another machine learned model, the presence of traffic lights or traffic signs, that the road surface is asphalt, cement, gravel, or the like, an evenness associated with the road, a weather, a time of the day, and/or the like. In some examples, the environmental feature may be determined and classified using map data from the localization component 422. For example, the map data can indicate the presence of traffic lights or traffic signs, road markers such as lane dividers, a presence of thru lane(s) and/or turning lane(s), whether the vehicle is at an intersection and a type of the intersection (e.g., a three way intersection or a four way intersection), the geometric feature of the region and/or location (e.g., the shape of the intersection) and/or the like.

At operation 510, the process can include updating and aggregating the prediction error and the relevant environmental features into the classification prediction error data. Similar to the operation 506, the remote computer may receive the prediction error and the associated environmental feature(s) and increase a total of the associated environmental feature in the aggregated prediction error data. Additional details with respect to operation 510 may be described in association with FIG. 1, as well as throughout this disclosure.

At operation 512, the process can include determining a maneuver type associated with the prediction error. For example, the maneuver type may be the unprotected left turn as illustrated in examples 104A-F of FIG. 1. Other examples of maneuver type may be, but are not limited to, crossing an intersection along a crosswalk, making a right turn, making a lane change, yielding to a crossing pedestrian, stopping at a yellow light, or the like.

A perception component can determine a maneuver type associated with the object based on a first position and/or first orientation of the object at a first time and a second position and/or a second orientation of the object at a subsequent second time. For example, the first time may be the time associated with example 104D and the second time may be time associated with the example 104F. In some examples, the maneuver type may be determined by determining a position of the object relative to an environmental feature. For example, the vehicle or the remote computing device can determine, due to a position of the object over time relative to a traffic signal indicating that the vehicle is slowing down to stop proximate the traffic signal that the maneuver type is stopping at a yellow light turning red.

At operation 514, the process can include updating and aggregating the prediction error and the relevant maneuver type into the classification prediction error data. Additional details with respect to operation 514 may be described in association with FIG. 1, as well as throughout this disclosure.

Similar to the operation 506, the remote computer may receive the prediction error and the associated maneuver type and increase a total of the associated maneuver type in the aggregated prediction error data based on receiving the prediction error.

At operation 516, the process can include determining a distribution associated with the aggregated prediction error based at least in part on the prediction error associated with the different error types. In some examples, the distribution may indicate percentages of prediction error counts and/or average or total magnitude that correspond with different error types. For example, the distribution may indicate a percentage of prediction errors that are associated with vehicles to a total number of predictions associated with vehicles or a percentage of prediction errors that are associated with vehicles to a total amount of all predictions errors.

In some examples, the different error types may be aggregated and combined across some or all of the object type, the maneuver type, and the environmental feature type. For example, the prediction error illustrated in the Example 104A-F may be separately determined as an object type of a vehicle, a maneuver type of an unprotected left turn, and an environmental feature type of a three-way intersection. The prediction error of the Example 104A-F may additionally be determined as a vehicle performing an unprotected left turn at a three-way intersection, a vehicle performing an unprotected left turn, and/or a vehicle at a three-way intersection. The distribution may, therefore, also indicate percentage(s) that indicates a vehicle performing an unprotected left turn at a three-way intersection, a vehicle performing an unprotected left turn, and/or a vehicle at a three-way intersection.

Alternatively, the distribution may be based on a magnitude of the prediction error (e.g., whether the prediction error indicates that the prediction was a little wrong or very wrong). The magnitude of the prediction error may be based on, for example, an Euclidean difference between points along a path taken by the object in the prediction and a path taken by the object as recorded in the sensor data, a distance between a final state of the object in the prediction and a final state of the object as recorded in the sensor data, an angular difference in a heading of the object, and/or the like. For example, in a scenario where a vehicle is turning into a road with a three lanes and the vehicle is predicted to turn into the leftmost lane, a magnitude of the prediction error may be higher when the vehicle is captured in the sensor data turning into the rightmost lane than when the vehicle is captured in the sensor data turning into the center lane. In some examples, the distribution can indicate an average magnitude of prediction error for an error type.

In some examples, the remote computing device can, based on the distribution, rank the different error types, where the highest rank is the error type with the highest percentage in the distribution and the lowest rank is the error type with the lowest percentage in the distribution. In some examples, the remote computing device may rank just the top ten highest error type from the distribution.

At operation 518, the process can include automatically adjusting a training dataset used for training a prediction model associated with the vehicle. In some examples, the remote computing device can adjust the training of the prediction model associated with the vehicle based on ranking of the error types. In such an example, the remote computing device may adjust the training by automatically adjusting a training dataset to include more scenario data associated with the error type with the highest rankings. (e.g., with the highest prediction error, a greatest score, a greatest percentage). For example, if the average prediction error for lane changes conducted at a particular intersection is highest among prediction errors determined for different error types, the number of scenarios that include log data collected from that intersection and that indicate that an object lane changed may be increased. In some examples, the training dataset may be automatically adjusted to include scenarios that include up to the top 10 highest prediction error type and may increase the number of scenarios commensurate to the ranking (e.g., a smaller increase as the ranking decreases). Additionally or alternatively, the training dataset may be altered to reduce scenarios associated with error types at the bottom of the ranking or with prediction errors that are below a lower bound or lower threshold prediction error.

After training, an updated prediction model may be transmitted to a prediction component of a vehicle such as the prediction component 426.

Figure 6:
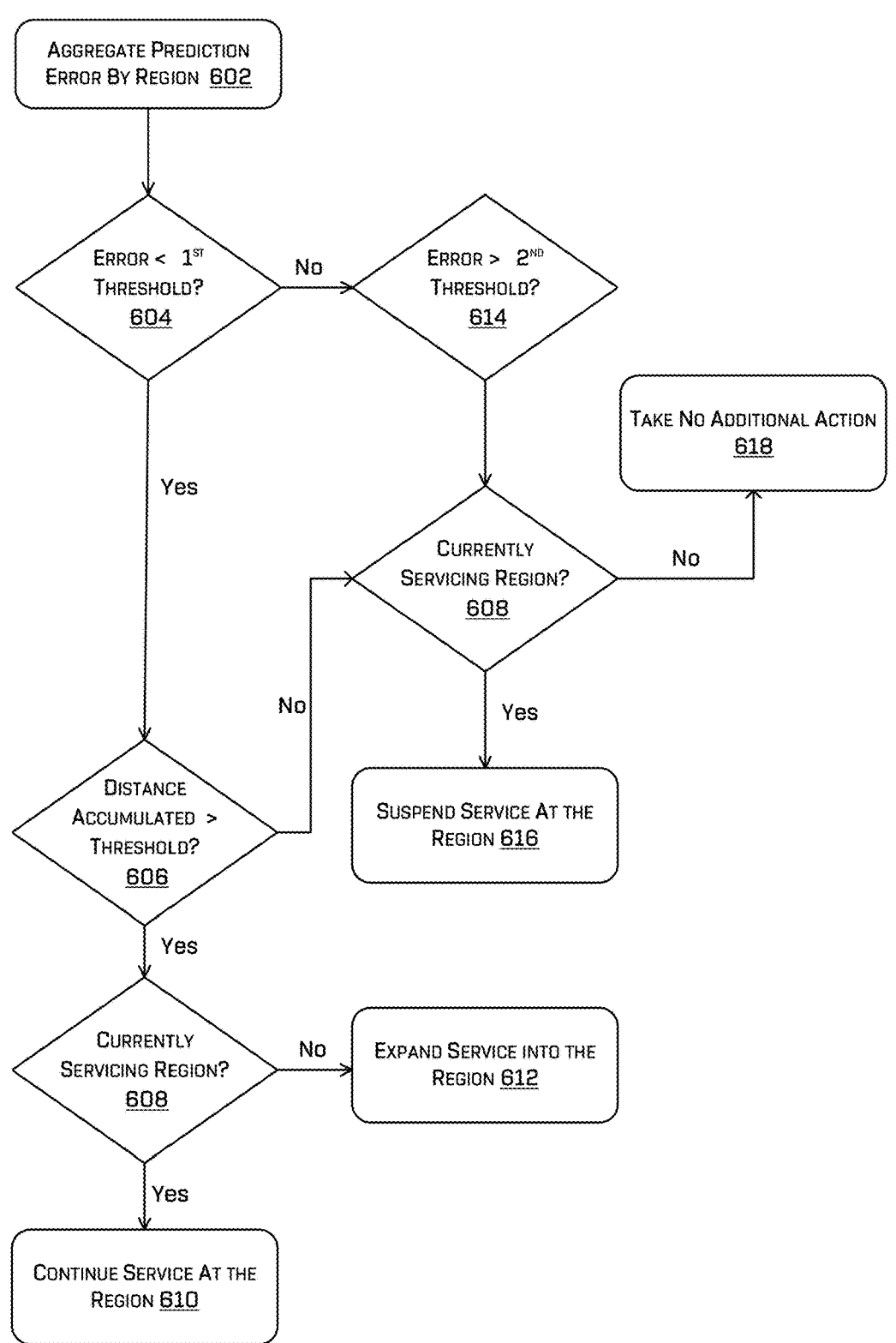
FIG. 6 illustrates a flow diagram of an example process of aggregating prediction error by region and determining an expansion of service into the region.

FIG. 6 illustrates a flow diagram of an example process 600 for aggregating prediction error by region and determining an expansion or suspension of service at the region.

In some examples, some or all of process 600 can be performed by one or more components described in association with FIGS. 1-4, as described herein. Additionally, some portions of process 500 can be omitted, replaced, and/or reordered.

At operation 602, the process can include aggregating prediction error by region. Additional details with respect to the operation 602 are described in association with FIG. 1, as well as throughout this disclosure.

At operation 604, the process can include determining whether the aggregated prediction error at the region is below a first error threshold. If so, then the process may continue to operation 606. If not, then the process may continue to operation 614 to determine whether the prediction error exceeds a second threshold different than the first threshold.

At the operation 606, the process can include determining whether an accumulated distance associated with the region is greater than threshold distance. In some examples, the accumulated distance may be a total miles or kilometers traversed by vehicles of the fleet through the region. In some examples, if the accumulated distance is greater than the threshold distance, then the process may continue to operation 608 to determine whether the vehicle or the fleet is currently servicing the region with a view toward proceeding to operation 612 to expand service into the region. If not, then the process may continue to operation 608 with a view toward proceeding to operation 616 to suspend service within the region. Additionally, the accumulated distance being less than the threshold distance may be indicative that the fleet does not have sufficient prediction data for the region and as a consequence the process can further include assigning vehicles from the fleet to traverse the region until the accumulated distance is greater than the threshold distance. Alternatively or additionally, wherein the threshold distance is a first threshold distance, the process can further comprise determining that the accumulated distance is below the first threshold distance and above a second threshold distance lower than the first threshold distance, the second threshold distance may represent a minimum miles/kilometers driven by vehicles in the fleet necessary to determine whether the aggregate prediction error may be used to determine whether to at least expand service into the region. When the accumulated distance is determined to be between the first threshold distance and the second threshold distance, the process can comprise determining that the aggregated prediction error is below a third error threshold that is lower than the first error threshold, and can further comprise determining to expand service into the region based on the accumulated distance being between the first threshold distance and the second threshold distance and the aggregate prediction error being below the third error threshold.

Additionally, in some examples, the process can further determine a false positive associated with low prediction error within the region. In some examples, determining the false positive can include determining a disengagement rate associated with the region. The disengagement rate may be a rate where the vehicles of the fleet suspends autonomous vehicle function and transmits a request for input from a teleoperations device. In some examples, a disengagement rate above a disengagement threshold may be indicative of even though a prediction error associated with the r is low, this may have been a result of constant teleoperation override of vehicle operation. Therefore, when the disengagement rate is above the disengagement threshold, the process can determine to not expand service into the region or to suspend service at or within the region.

At the operation 608, if the accumulated distance is greater than the threshold distance, the process can proceed to operation 610 if the vehicle or the fleet is already servicing the region. In some examples, the fleet is servicing the region if the vehicles in the fleet is permitted to pickup or drop off passengers within the region and/or permitted to set a trajectory through the region. If so, the process can proceed to the operation 612 to expand service into the region or expand a service area size of the fleet to include the region. At operation 612, the process can include, but not limited to, instructing, by the remote computing device, to the vehicles of the fleet to permit the vehicles of the fleet to set trajectories that traverses through the region during normal vehicle operation and to permit the vehicles of the fleet to pick up and drop off passengers within the region.

Alternatively, in some examples, rather than determining whether the aggregated prediction error at the region is below a first threshold, the prediction error at the region may be compared with prediction errors at other regions. For example, the aggregated prediction error data can indicate a second prediction error for a second region that is currently being serviced by the vehicle or the fleet and the remote computing device can determine to expand service into the region based on whether the prediction error is less than the second prediction error.

In some examples, the remote computing device can determine that when the aggregated prediction error at the region is greater than the first threshold and the accumulated distance at the region is less than the threshold distance, to compare the aggregate prediction error or a trend in determining the aggregate prediction error over time with other region(s) that are currently being serviced by the fleet and have similar environmental features or by comparing the prediction errors for the region with log data with other region(s) similar to the region, a similarity in prediction errors between the region and the other region(s) or a similarity in a trend in determining prediction errors, and further determine that because the region and the other region(s) exhibit similarities in the prediction errors or the prediction error trend(s), to increase the first threshold to above the aggregated prediction error such that the process can proceed to the operation 612 to expand service into the region.

In some examples, the distance accumulated may be determined based on a weather condition and/or a time of day condition. For example, a fleet may have an accumulated distance greater than the threshold distance during a sunny day and/or between morning rush and evening rush, but does not have enough accumulated distance for a snowy day and/or during morning rush and/or evening rush. Therefore, during a sunny day and/or between morning rush and evening rush, the operations 606 and 608 can determine that the fleet has accumulated enough distance to service the region. However, when the weather turns snowy and/or when the time of the day enters the evening rush, the operations 606 and 608 can determine that while the fleet had accumulated enough distance to service the region, now that the weather condition has changed to snow and/or the time of the day has changed to the evening rush, that there is not enough accumulated distance to allow continued service through the region, and therefore, determine to suspend service at the region.

At operation 614, the process can include determining whether the aggregated prediction error at the region is greater than the second error threshold. In some examples, the second error threshold may be a higher threshold than the first error threshold. For example, the first error threshold may be twenty percent prediction error and the second error threshold may be forty percent prediction error. In some examples, the first error threshold may represent the prediction error that's required to expand service into the region and the second error threshold represents the prediction error to suspend service within the region.

After the operation 614, the process can continue to the operation 608 to determine whether the vehicle or the fleet is currently servicing the region. If not, then the process may proceed to operation 618 to take no additional action. If so, then the process may proceed to the operation 616 to suspend service within the region or shrink the service area size of the fleet to exclude the region. In some examples, suspending service within the region can include, but not limited to, instructing, by the remote computing device, the vehicles within the fleet to suspend picking up and dropping off of passengers within the region and set trajectories of the vehicles of the fleet to avoid the region.

Additionally, the process can further include determining a weather condition or a time of the day associated with the aggregated first prediction error being below the first error threshold and above the second error threshold and automatically expand service or suspend service within the region based on the weather condition or the time of the day. Further, the process can include automatically expanding or suspending service within the region based on a traffic pattern (e.g., traffic congestion) or an event within the region (e.g., a sporting event, a concert).

Example Clauses

A: A system comprising: one or more processors; and one or more computer-readable media storing computer-executable instructions that, when executed, cause the one or more processors to perform operations comprising: receiving first sensor data captured by a vehicle located within a region at a first time, the first sensor data indicating an object; determining, using a machine-learned model, a predicted state associated with the object, the predicted state comprising at least a pose of the object at a second time or a maneuver performed by the object; receiving second sensor data captured by the vehicle at a second time, the second sensor data indicating the object; determining, based at least in part on the second sensor data, a state of the object at the second time; determining a prediction error based at least in part on a difference between the predicted state and the state of the object at the second time; determining to associate the prediction error with an error type based at least in part on determining, based at least in part on at least one the first sensor data or the second sensor data, at least one of an object classification, an environmental feature classification, or a maneuver classification to associate with the prediction error as the error type; and training the machine-learned model based at least in part on the error type.

B: The system of paragraph A, wherein the object classification comprises one or more of: an object type; an object position relative to the vehicle or a second object; an object type associated with the second object; or an object speed.

C: The system of paragraph A or B, the operations further comprising determining one or more of: a first total prediction error based at least in part on the prediction error and one or more other prediction errors; a second total prediction error based at least in part on the prediction error and one or more other prediction errors of a same prediction error type; or a third total prediction error based at least in part on the prediction error and one or more other prediction errors determined for predictions determined while the vehicle was in the region.

D: The system of paragraph C, the operations further comprising: determining a distribution associated with the prediction error, the distribution comprising a percentage of the second total prediction error or the third total prediction error to the first total prediction error.

E: The system of any of paragraphs A-D, wherein training the machine-learned model comprises automatically adjusting, based at least in part on the prediction error, a training dataset associated with the machine-learned model, the automatic adjustment comprises automatically adding training data classified with a same classification as at least one the object classification, the environmental feature classification, or the maneuver classification.

F: A method comprising: receiving first data captured at a first time, the first data indicating an object; determining, using a machine-learned model, a predicted state associated with the object; receiving second data captured at a second time, the second data indicating the object; determining, based at least in part on the second data, a state of the object at the second time; determining a prediction error based at least in part on a difference between the predicted state and the state of the object at the second time; determining to associate the prediction error with an error type based at least in part on at least one the first data or the second data; and training the machine-learned model based at least in part on the error type.

G: The method of paragraph F, wherein the first and the second data are sensor data captured by a vehicle.

H: The method of paragraph F or G, wherein the determining to associate the prediction error with the error type comprises determining, based at least in part on at least one the first data or the second data, at least one of an object classification, an environmental feature classification, or a maneuver classification to associate with the prediction error as the error type.

I: The method of paragraph H, wherein the training the machine-learned model comprises automatically adjusting, based at least in part on the prediction error, a training dataset associated with the machine-learned model, the automatic adjustment comprises automatically adding training data classified with a same classification as at least one the object classification, the environmental feature classification, or the maneuver classification.

J: The method of paragraph H or I, wherein the object classification comprises one or more of: an object type; an object position relative to a vehicle that captured the first data or the second data or a second object; an object type associated with the second object; or an object speed.

K: The method of any of paragraphs F-J, further comprising determining wherein the training a first total prediction error based at least in part on the prediction error and one or more other prediction errors.

L: The method of paragraph K, further comprising one or more of: a second total prediction error based at least in part on the prediction error and one or more other prediction errors of a same prediction error type; or a third total prediction error based at least in part on the prediction error and one or more other prediction errors determined for predictions determined while a vehicle was in a region.

M: The method of paragraph L, further comprises determining a distribution associated with the prediction error, the distribution comprises a percentage of the second total prediction error or the third total prediction error to the first total prediction error.

N: The method of paragraph M, wherein the error type is a first error type, further comprising determining a fourth total prediction error based at least in part on the prediction error and one or more other prediction errors of a same second prediction error type; and wherein the distribution further comprises a percentage of the fourth total prediction error to the first total prediction error.

O: The method of paragraph N, further comprises: determining, based on the percentage of the second total prediction error being higher than the percentage of the fourth total prediction error, a first rank associated with the percentage of the second total prediction error and a second rank lower than the first rank associated with the percentage of the fourth total prediction error; and wherein training the machine-learned model comprises automatically adjusting a training dataset associated with the machine-learned model, the automatic adjustment comprises automatically adding more training data associated with the second total prediction error than training data associated with the fourth total prediction error.

P: One or more non-transitory computer-readable media storing instructions executable by one or more processors, wherein the instructions, when executed, cause the one or more processors to perform operations comprising: receiving first data captured at a first time, the first data indicating an object; determining, using a machine-learned model, a predicted state associated with the object; receiving second data captured at a second time, the second data indicating the object; determining, based at least in part on the second data, a state of the object at the second time; determining a prediction error based at least in part on a difference between the predicted state and the state of the object at the second time; determining to associate the prediction error with an error type based at least in part on at least one the first data or the second data; and training the machine-learned model based at least in part on the error type.

Q: The one or more non-transitory computer-readable media of paragraph P, wherein the determining to associate the prediction error with the error type comprises determining, based at least in part on at least one the first data or the second data, at least one of an object classification, an environmental feature classification, or a maneuver classification to associate with the prediction error as the error type R: The one or more non-transitory computer-readable media of paragraph Q, wherein the training the machine-learned model comprises automatically adjusting, based at least in part on the prediction error, a training dataset associated with the machine-learned model, the automatic adjustment comprises automatically adding training data classified with a same classification as at least one the object classification, the environmental feature classification, or the maneuver classification.

S: The one or more non-transitory computer-readable media of any of paragraphs P-R, the operations further comprising determining one or more of: a first total prediction error based at least in part on the prediction error and one or more other prediction errors; a second total prediction error based at least in part on the prediction error and one or more other prediction errors of a same prediction error type; or a third total prediction error based at least in part on the prediction error and one or more other prediction errors determined for predictions determined while a vehicle was in a region T: The one or more non-transitory computer-readable media of paragraph S, the operations further comprising: determining a distribution associated with the prediction error, the distribution comprising a percentage of the second total prediction error or the third total prediction error to the first total prediction error.

U: A system comprising: one or more processors; and one or more non-transitory computer-readable media storing computer-executable instructions that, when executed, cause the one or more processors to perform operations comprising: receiving first sensor data captured by a first vehicle located within a region at a first time, the first sensor data indicating an object; determining, using a machine-learned model, a predicted state associated with the object, the predicted state comprising at least a pose of the object at a second time or a maneuver performed by the object; receiving second sensor data captured by the first vehicle at a second time, the second sensor data indicating the object; determining, based at least in part on the second sensor data, a state of the object at the second time; determining a prediction error based at least in part on a difference between the predicted state and the state of the object at the second time; determining to associate the prediction error with the region; determining, based at least in part on associating the prediction error with the region, to at least one expand service associated with a fleet comprising the first vehicle into the region or to increase a number of vehicles in the fleet that are permitted to operate in the region; and transmitting, based on the determination to expand service or to increase the number of vehicles, an instruction to a second vehicle in the fleet to generate a trajectory traversing the region.

V: The system of paragraph U, the operations further comprising: determining a first total prediction error based at least in part on the prediction error and one or more other prediction errors; determining a second total prediction error based at least in part on the prediction error and one or more other prediction errors of a same region; and determining, based at in part on the first total prediction error and the second total prediction error, a prediction error metric, the metric comprising a percentage of the second total prediction error to the first total prediction error.

W: The system of paragraph V, wherein the determining to expand service or increase the number of vehicles operating in the region comprises: determining that the metric or the second total prediction error is below a first error threshold; determining that the second vehicle is prohibited from one or more of: picking up or dropping off a passenger within the region; or generating a trajectory to traverse through the region; determining, based at least in part on the prohibition, that an accumulated distance associated with the fleet at the region exceeds a threshold distance; and determining, based at least in part on the accumulated distance exceeding the threshold distance, to expand service into the region.

X: The system of paragraph W, the operations further comprising: receiving third sensor data captured by the first vehicle at a third time, the third sensor data indicating a second object; determining a second predicted state associated with the second object; receiving fourth sensor data captured by the first vehicle at a fourth time, the fourth sensor data indicating the second object; determining, based at least in part on the fourth sensor data, a state of the second object at the fourth time; determining a second prediction error based at least in part on a difference between the second predicted state and the state of the second object at the fourth time; determining to associate the prediction error with the region; and updating the first total prediction error, the second total prediction error, and the prediction error metric based at least in part on the second prediction error.

Y: The system of paragraph X, the operations further comprising: determining that the second vehicle associated is permitted to one or more of: pick up or dropping off a passenger within the region; or set a trajectory to traverse through the region; determining, based at least in part on determining that the metric or the second total prediction error is above a second error threshold, to prevent the second vehicle from performing one or more of: picking up or dropping off a passenger within the region; or generating a trajectory to traverse through the region.

Z: A method comprising: receiving first data captured at a first time, the first data indicating an object; determining a predicted state associated with the object; receiving second data captured at a second time, the second data indicating the object; determining, based at least in part on the second data, a state of the object at the second time; determining a prediction error based at least in part on a difference between the predicted state and the state of the object at the second time; determining to associate the prediction error with a region; and determining a first total prediction error based at least in part on the prediction error and one or more other prediction errors of the region.

AA: The method of paragraph Z, further comprising: determining a second total prediction error based least in part on the prediction error and one or more other prediction errors. determining, based at in part on the first total prediction error and the second total prediction error, a prediction error metric, the metric comprising a percentage of the second total prediction error to the first total prediction error.

AB: The method of paragraph AA, further comprising: determining that the metric or the first total prediction error is below a first error threshold; determining that a vehicle associated with a fleet comprising the vehicle is prohibited from one or more of: picking up or dropping off a passenger within the region; or generating a trajectory to traverse through the region; and determining, based at least in part on the prohibition and the metric or the first total prediction error being below the first error threshold, to expand service into the region or increase a service size associated with the fleet.

AC: The method of paragraph AB, further comprising transmitting, based at least in part on the expansion of service into the region or the increase in the service size, an instruction to the vehicle to generate a trajectory traversing the region.

AD: The method of paragraph AB or AC, further comprising: determining that an accumulated distance associated with the fleet at the region exceeds a threshold distance; and wherein determining to expand service or increase the service size is further based on determining that the accumulated distance exceeds the threshold distance.

AE: The method of any of paragraphs AB-AD, wherein the object is a first object, the method further comprising: receiving third data captured at a third time, the third data indicating a second object; determining a second predicted state associated with the second object; receiving fourth data captured at a fourth time, the fourth data indicating the second object; determining, based at least in part on the fourth data, a state of the second object at the fourth time; determining a second prediction error based at least in part on a difference between the second predicted state and the state of the second object at the fourth time; determining to associate the prediction error with the region; and updating the first total prediction error, the second total prediction error, and the prediction error metric based at least in part on the second prediction error.

AF: The method of paragraph AE, further comprising: determining that an accumulated distance associated with the fleet is between a first threshold distance and a second threshold distance; determining that the first total prediction error or the prediction error metric is below a second error threshold, the second error threshold being lower than the first error threshold; and determining, based at least in part on the accumulated distance being between the first threshold distance and the second threshold distance and the first total prediction error or the prediction error metric being below the second error threshold, to expand service into the region or increase a service size associated with the fleet.

AG: The method of paragraph AE or AF, further comprising: determining that the vehicle associated is permitted to one or more of: picking up or dropping off the passenger within the region; or generating the trajectory to traverse through the region; determining, based at least in part on determining that the metric or the second total prediction error is above a second error threshold, to prevent the vehicle from performing one or more of: picking up or dropping off the passenger within the region; or generating the trajectory to traverse through the region.

AH: The method of any of paragraphs AB-AG, further comprising: determining a disengagement metric associated with the region, the disengagement metric is associated with a suspension of autonomous vehicle operation; and determining, based at least in part on the disengagement metric exceeding a disengagement threshold and determining that the vehicle is permitted to perform one or more of picking up or dropping off the passenger within the region or generating the trajectory to traverse through the region, to prevent the vehicle from performing one or more of: picking up or dropping off the passenger within the region; or generating the trajectory to traverse through the region.

AI: The method of any of paragraphs Z-AH, further comprising: instructing a vehicle to traverse through the region based on at least in part on determining that an accumulated distance associated with the region is below a threshold distance.

AJ: One or more non-transitory computer-readable media storing instructions executable by a processor, wherein the instructions, when executed, cause the processor to perform operations comprising: receiving first data captured at a first time, the first data indicating an object; determining a predicted state associated with the object; receiving second data captured at a second time, the second data indicating the object; determining, based at least in part on the second data, a state of the object at the second time; determining a prediction error based at least in part on a difference between the predicted state and the state of the object at the second time; determining to associate the prediction error with a region; and determining a first total prediction error based at least in part on the prediction error and one or more other prediction errors of the region.

AK: The one or more non-transitory computer-readable media of paragraph AJ, the operations further comprising: determining a second total prediction error based least in part on the prediction error and one or more other prediction errors. determining, based at in part on the first total prediction error and the second total prediction error, a prediction error metric, the metric comprising a percentage of the second total prediction error to the first total prediction error.

AL: The one or more non-transitory computer-readable media of paragraph AK, the operations further comprising: determining that the metric or the first total prediction error is below a first error threshold; determining that a vehicle associated with a fleet comprising the vehicle is prohibited from one or more of: picking up or dropping off a passenger within the region; or generating a trajectory to traverse through the region; and V: determining, based at least in part on the prohibition and the metric or the first total prediction error being below the first error threshold, to expand service into the region or increase a service size associated with the fleet.

AM: The one or more non-transitory computer-readable media of paragraph AL, the operations further comprising: transmitting, based at least in part on the expansion of service into the region or the increase in the service size, an instruction to the vehicle to generate a trajectory traversing the region.

AN: The one or more non-transitory computer-readable media of paragraph AL or AM, the operations further comprising: determining that an accumulated distance associated with the fleet at the region exceeds a threshold distance; and wherein determining to expand service or increase the service size is further based on determining that the accumulated distance exceeds the threshold distance.

While the example clauses described above are described with respect to one particular implementation, it should be understood that, in the context of this document, the content of the example clauses can also be implemented via a method, device, system, computer-readable medium, and/or another implementation. Additionally, any of examples A-## may be implemented alone or in combination with any other one or more of the examples A-##.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the one or more processors to perform operations comprising:
      receiving first sensor data captured by a first vehicle located within a region at a first time, the first sensor data indicating an object;
      determining, using a machine-learned model, a predicted state associated with the object, the predicted state comprising at least a pose of the object at a second time or a maneuver performed by the object;
      receiving second sensor data captured by the first vehicle at the second time, the second sensor data indicating the object;
      determining, based at least in part on the second sensor data, a state of the object at the second time;

determining a prediction error based at least in part on a difference between the predicted state and the state of the object at the second time;

determining to associate the prediction error with the region;

determining, based at least in part on associating the prediction error with the region, a prediction error metric;

determining, based at least in part on comparing the prediction error metric to at least one of a first threshold associated with expansion of service or a second threshold associated with disengagement of service, to at least one of:

expand service associated with a fleet of autonomous vehicles comprising the first vehicle into the region, or increase a number of vehicles in the fleet that are permitted to operate in the region, wherein the second threshold is higher than the first threshold; and instructing, based on determining to expand service or to increase the number of vehicles, a second vehicle in the fleet to generate a trajectory traversing the region, wherein the second vehicle in the fleet is configured to traverse the region based at least in part on the trajectory.

2. The system of claim 1, the operations further comprising:

determining a first total prediction error based at least in part on the prediction error and one or more other prediction errors;

determining a second total prediction error based at least in part on the prediction error and one or more other prediction errors of a same region; and wherein the prediction error metric comprises a percentage of the second total prediction error to the first total prediction error.

3. The system of claim 2, wherein determining to expand service or to increase the number of vehicles in the fleet that are permitted to operate in the region comprises:

determining that the prediction error metric or the second total prediction error is below a first error threshold;

determining, as a prohibition, that the second vehicle is prohibited from one or more of:

picking up or dropping off a passenger within the region; or generating the trajectory to traverse through the region;

determining, based at least in part on the prohibition, that an accumulated distance associated with the fleet at the region exceeds a threshold distance; and determining, based at least in part on the accumulated distance exceeding the threshold distance, to expand service into the region.

4. The system of claim 3, the operations further comprising:

receiving third sensor data captured by the first vehicle at a third time, the third sensor data indicating a second object;

determining a second predicted state associated with the second object;

receiving fourth sensor data captured by the first vehicle at a fourth time, the fourth sensor data indicating the second object;

determining, based at least in part on the fourth sensor data, a state of the second object at the fourth time;

determining a second prediction error based at least in part on a difference between the second predicted state and the state of the second object at the fourth time;

determining to associate the prediction error with the region; and updating the first total prediction error, the second total prediction error, and the prediction error metric based at least in part on the second prediction error.

5. The system of claim 4, the operations further comprising:

determining that the second vehicle associated is permitted to one or more of:

pick up or dropping off a passenger within the region; or set the trajectory to traverse through the region;

determining, based at least in part on determining that the prediction error metric or the second total prediction error is above the second threshold, to prevent the second vehicle from performing one or more of:

picking up or dropping off the passenger within the region; or generating the trajectory to traverse through the region.

6. A method comprising:

receiving first data captured at a first time, the first data indicating an object;

determining a predicted state associated with the object;

receiving second data captured at a second time, the second data indicating the object;

determining, based at least in part on the second data, a state of the object at the second time;

determining a prediction error based at least in part on a difference between the predicted state and the state of the object at the second time;

determining to associate the prediction error with a region;

determining a first total prediction error based at least in part on the prediction error and one or more other prediction errors of the region;

determining, based at least in part on the first total prediction error, a prediction error metric;

determining, based at least in part on comparing the prediction error metric to at least one of a first error threshold or a second error threshold higher than the first error threshold, to at least one of:

expand service associated with a fleet of vehicles into the region, or increase a number of vehicles in the fleet that are permitted to operate in the region; and instructing, based at least in part on determining to at least one of expand service or to increase the number of vehicles, an individual vehicle in the fleet to generate a trajectory traversing the region, wherein the individual vehicle in the fleet is configured to traverse the region based at least in part on the trajectory.

7. The method of claim 6, further comprising:

determining a second total prediction error based least in part on the prediction error and one or more other prediction errors; and wherein the prediction error metric comprises a percentage of the second total prediction error to the first total prediction error.

8. The method of claim 7, further comprising:

determining that the prediction error metric or the first total prediction error is below the first error threshold;

determining, as a prohibition, that a vehicle associated with the fleet of vehicles, the fleet comprising the vehicle, is prohibited from one or more of:

picking up or dropping off a passenger within the region; or generating the trajectory to traverse through the region; and determining, based at least in part on the prohibition and the prediction error metric or the first total prediction error being below the first error threshold, to expand service into the region or to increase a service size associated with the fleet.

9. The method of claim 8, further comprising:

determining that an accumulated distance associated with the fleet at the region exceeds a threshold distance; and wherein determining to expand service or to increase the service size is further based on determining that the accumulated distance exceeds the threshold distance.

10. The method of claim 8, wherein the object is a first object, the method further comprising:

receiving third data captured at a third time, the third data indicating a second object;

determining a second predicted state associated with the second object;

receiving fourth data captured at a fourth time, the fourth data indicating the second object;

determining, based at least in part on the fourth data, a state of the second object at the fourth time;

determining a second prediction error based at least in part on a difference between the second predicted state and the state of the second object at the fourth time;

determining to associate the prediction error with the region; and updating the first total prediction error, the second total prediction error, and the prediction error metric based at least in part on the second prediction error.

11. The method of claim 10, further comprising:

determining that an accumulated distance associated with the fleet is between a first threshold distance and a second threshold distance;

determining that the first total prediction error or the prediction error metric is below a third error threshold, the third error threshold being lower than the first error threshold; and determining, based at least in part on the accumulated distance being between the first threshold distance and the second threshold distance and the first total prediction error or the prediction error metric being below the third error threshold, to expand service into the region or to increase a service size associated with the fleet.

12. The method of claim 11, further comprising:

determining that the vehicle associated with the fleet of vehicles is permitted to perform one or more of:

picking up or dropping off the passenger within the region; or generating the trajectory to traverse through the region;

determining, based at least in part on determining that the prediction error metric or the second total prediction error is above the second error threshold, to prevent the vehicle from performing one or more of:

picking up or dropping off the passenger within the region; or generating the trajectory to traverse through the region.

13. The method of claim 8, further comprising:

determining a disengagement metric associated with the region, the disengagement metric is associated with a suspension of autonomous vehicle operation; and determining, based at least in part on the disengagement metric exceeding a disengagement threshold and determining that the vehicle is permitted to perform one or more of picking up or dropping off the passenger within the region or generating the trajectory to traverse through the region, to prevent the vehicle from performing one or more of:

picking up or dropping off the passenger within the region; or generating the trajectory to traverse through the region.

14. The method of claim 6, further comprising:

instructing a vehicle to traverse through the region based at least in part on determining that an accumulated distance associated with the region is below a threshold distance.

15. One or more non-transitory computer-readable media storing instructions executable by a processor, wherein the instructions, when executed, cause the processor to perform operations comprising:

receiving first data captured at a first time, the first data indicating an object;

determining a predicted state associated with the object;

receiving second data captured at a second time, the second data indicating the object;

determining, based at least in part on the second data, a state of the object at the second time;

determining a prediction error based at least in part on a difference between the predicted state and the state of the object at the second time;

determining to associate the prediction error with a region;

determining a first total prediction error based at least in part on the prediction error and one or more other prediction errors of the region determining, based at least in part on the first total prediction error, a prediction error metric;

determining, based at least in part on comparing the prediction error metric to at least one of a first threshold or a second threshold higher than the first threshold, to at least one of:

expand service associated with a fleet of vehicles into the region, or increase a number of vehicles in the fleet that are permitted to operate in the region; and permitting, based at least in part on determining to at least one of expand service or to increase the number of vehicles, a vehicle associated with the fleet to traverse the region, wherein the vehicle was previously prohibited from traversing the region.

16. The one or more non-transitory computer-readable media of claim 15, the operations further comprising:

determining a second total prediction error based least in part on the prediction error and one or more other prediction errors; and wherein the prediction error metric comprises a percentage of the second total prediction error to the first total prediction error.

17. The one or more non-transitory computer-readable media of claim 16, the operations further comprising:

determining that the prediction error metric or the first total prediction error is below a first error threshold;

determining, as a prohibition, that the vehicle associated with the fleet is prohibited from one or more of:

picking up or dropping off a passenger within the region; or generating a trajectory to traverse through the region; and determining, based at least in part on the prohibition and the prediction error metric or the first total prediction error being below the first error threshold, to expand service into the region or to increase a service size associated with the fleet.

18. The one or more non-transitory computer-readable media of claim 17, the operations further comprising:

transmitting, based at least in part on permitting the vehicle associated with the fleet to traverse the region and determining to expand service into the region or to increase the service size, an instruction to the vehicle to generate a trajectory traversing the region.

19. The one or more non-transitory computer-readable media of claim 17, the operations further comprising:

determining that an accumulated distance associated with the fleet at the region exceeds a threshold distance; and wherein determining to expand service or to increase the service size is further based on determining that the accumulated distance exceeds the threshold distance.

20. The method of claim 6, wherein determining to at least one of expand service or to increase the number of vehicles operating in the region comprises:

determining that the prediction error metric exceeds the first error threshold;

determining a third error threshold associated with an additional region, the additional region being serviced by the fleet of vehicles; and determining to at least one of expand service or to increase the number of vehicles based at least in part on the prediction error metric being below the third error threshold.

* * * * *